United States Patent
Ray et al.

(10) Patent No.: US 9,052,999 B1
(45) Date of Patent: Jun. 9, 2015

(54) METHOD AND SYSTEM FOR TRANSMITTING A DETERMINED ALTITUDE OF A USER EQUIPMENT DEVICE LOCATED IN A BUILDING

(71) Applicant: Sprint Spectrum L.P., Overland Park, KS (US)

(72) Inventors: Amar Nath Ray, Shawnee, KS (US); Tracy L. Nelson, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/024,128

(22) Filed: Sep. 11, 2013

(51) Int. Cl.
*G06F 17/00* (2006.01)

(52) U.S. Cl.
CPC ..................................... *G06F 17/00* (2013.01)

(58) Field of Classification Search
None
See application file for complete search history.

(56) References Cited

U.S. PATENT DOCUMENTS

| | | | |
|---|---|---|---|
| 7,072,666 B1 | 7/2006 | Kullman et al. | |
| 7,991,382 B1 * | 8/2011 | Gunasekara | 455/404.2 |
| 8,284,100 B2 | 10/2012 | Vartanian et al. | |
| 2004/0033808 A1 * | 2/2004 | Rorabaugh | 455/456.1 |
| 2007/0099628 A1 * | 5/2007 | Twitchell, Jr. | 455/456.1 |
| 2007/0099629 A1 * | 5/2007 | Twitchell, Jr. | 455/456.1 |
| 2008/0045234 A1 * | 2/2008 | Reed | 455/456.1 |
| 2010/0317317 A1 * | 12/2010 | Maier et al. | 455/404.2 |
| 2011/0294460 A1 * | 12/2011 | Zhu et al. | 455/404.1 |
| 2013/0109406 A1 * | 5/2013 | Meador et al. | 455/456.1 |

* cited by examiner

*Primary Examiner* — John R Olszewski
*Assistant Examiner* — Jess Whittington

(57) ABSTRACT

Disclosed is a method and corresponding system for transmitting a determined altitude of a user equipment device located in a building. One embodiment takes the form of a method. The method may involve determining a first distance between a node at a known position in a building and a user equipment device located in the building based on known planar coordinates of the node and known planar coordinates of the user equipment device. The method may further involve determining a second distance between the user equipment device and the node based on propagation of at least one signal between the node and the user equipment device. The method may further involve determining an altitude of the user equipment device based on the determined first distance, the determined second distance, and a known altitude of the node. And the method may involve transmitting the determined altitude of the user equipment device.

13 Claims, 7 Drawing Sheets

METHOD AND SYSTEM FOR TRANSMITTING A DETERMINED ALTITUDE OF A USER EQUIPMENT DEVICE LOCATED IN A BUILDING

BACKGROUND

Unless otherwise indicated herein, the materials described in this section are not prior art to the claims and are not admitted to be prior art by their inclusion in this section.

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. These client-side devices are generally referred to in this disclosure as user equipment devices, though this term is intended to broadly encompass various devices known by terms such as mobile stations, mobile devices, access terminals, wireless-communication devices, cellphones, smartphones, personal digital assistants (PDAs), tablets, laptops, air cards, Universal Serial Bus (USB) devices (e.g., dongles), and/or any other device(s) capable of functioning as a mobile station according to this disclosure. Via the RAN, a user equipment device generally engages in communications such as voice calls, emergency service calls, packet-data sessions, text messaging (e.g., Short Message Service (SMS) messaging), and the like.

Furthermore, the wireless communication between the RAN and each user equipment device is typically bidirectional in nature. The component of that communication that is sent from the RAN to the user equipment device is described as being sent on what is known as the forward link, while the component that is sent from the user equipment device to the RAN is described as being sent on what is known as the reverse link. On both links, the wireless communications are typically formatted in accordance with a wireless-communication protocol, one example type of which is Long Term Evolution (LTE). More generally, RANs can be arranged to operate according to any of numerous protocols, some other examples of which are Code Division Multiple Access (CDMA), Universal Mobile Telecommunications System (UMTS), WiMAX (IEEE 802.16), Time Division Multiple Access (TDMA), Global System for Mobile Communications (GSM), Wi-Fi (IEEE 802.11), and the like.

In RANs that are of a type known as wireless wide area networks (WWANs) (or cellular wireless networks), the entities with which user equipment devices communicate over the air interface are known by terms such as base station and access node, terms that are used at different times in different ways to refer to different entities. For example, the term base station is sometimes used to refer simply to a device also known as a base transceiver station (BTS), which contains the hardware, antennas, and other components that cooperate to actually conduct the over-the-air (OTA) communication with the user equipment device on behalf of the RAN. In LTE networks, a BTS is typically referred to as an eNodeB, which stands for Evolved Node B, named as being an evolved version of a Node B in a UMTS Terrestrial RAN (or UTRAN). At times, however, the term base station or access node is used to refer in combination to (i) one or more BTSs and (ii) a device known as a base station controller (BSC) (or radio network controller (RNC)), which controls the BTS(s) and connects it (them) to the rest of the network and beyond.

OVERVIEW

As referenced above, one of the typical types of communication in which user equipment devices engage via RANs is emergency service calls. For example, a user equipment device may initiate an emergency service call, such as a 9-1-1 call, with an emergency service system. In general, emergency service systems may include a Public Safety Answer Point (PSAP) that may dispatch emergency assistance to the location of the user equipment device.

Typically, when a user equipment device initiates an emergency service call with an emergency service system that includes a P SAP, it is desirable for the PSAP to receive information about the location of the user equipment device so that the PSAP can dispatch emergency assistance to that location. In some cases, the user equipment device may provide information about its location to the PSAP. In other cases, the user equipment device may provide information about its location to an intermediary in a communication path between the user equipment device and the PSAP, and the intermediary may then provide the information to the PSAP.

In some situations, the user equipment device may provide information about its location by providing coordinates that correspond with its location. The coordinates may include planar coordinates, such as a latitude or longitude, and an altitude. The term "altitude," as used in this disclosure, may also be referred to as elevation. With this arrangement, the user equipment device may provide the coordinates to the PSAP or the intermediary, and the PSAP may dispatch emergency assistance to that location in response to the provided coordinates. As a result, in some such situations, it may be desirable for the user equipment device to provide coordinates that accurately correspond with its location within a certain time period (e.g., less than 30 seconds) so that the PSAP can quickly dispatch emergency assistance to the location of the user equipment device. In some such situations, the certain time period may be with respect to placement of an emergency service call or after setup of the emergency service call.

Moreover, in some situations, when a user equipment device that is located in a building initiates an emergency service call with an emergency service system that includes a PSAP, the user equipment device's altitude may be important information about its location in the building. For instance, when the user equipment device is located in a tall building, such as a skyscraper, the user equipment device's altitude may be especially important information about its location in the building, because the height of the building may be greater than one or more planar dimensions of the tall building, such as a width and length. As a result, in some such situations, it may be desirable for the PSAP to receive information about the altitude of the user equipment so that the PSAP can quickly dispatch emergency assistance to the location in the building of the user equipment device.

In some implementations, a user equipment device may include a Global Positioning System (GPS) receiver for receiving GPS satellite signals, and the user equipment device may provide one or more coordinates that correspond with its location using the received signals. In general, when the user equipment device has a clear view of GPS satellites in the sky, the user equipment device may receive signals from the GPS satellites and determine the one or more coordinates using the received signals.

In practice, upon being powered on, or in response to some other command or triggering event, the user equipment device may use its GPS receiver to attempt to obtain an initial GPS fix, which typically involves receiving signals from one or more GPS satellites, and using those signals to compute one or more coordinates that correspond with its location. For instance, in some situations, the user equipment device may need a clear view (e.g., a line of sight view) of multiple GPS satellites in the sky (e.g., four GPS satellites) to obtain an initial GPS fix for determining an altitude that corresponds with its altitude.

Further, the user equipment device may determine the one or more coordinates with the assistance of a network entity, such as a position determining entity (PDE). For instance, the user equipment device may send the data it receives from the one or more GPS satellites to the PDE, and the PDE may then do the necessary calculations and return the one or more coordinates to the user equipment device.

Unfortunately, a user equipment device providing an altitude that corresponds with its location using received GPS satellite signals may have drawbacks. For example, in some situations, such as when the user equipment device is located in a building, the user equipment device may not have a clear view of multiple GPS satellites in the sky. As a result, the user equipment device may not be able to obtain an initial GPS fix, and thus may not be able to determine an altitude that corresponds with its altitude using GPS satellite signals.

As another example, even when the user equipment device may be able to obtain an initial GPS fix, the user equipment device may take up to 30 seconds to determine an altitude that corresponds with the altitude of the user equipment device. And as still another example, even when the user equipment device may be able to obtain an initial GPS fix, the determined altitude may correspond less accurately than, for example, determined planar coordinates correspond with the planar coordinates of the user equipment device. As a result, the determined altitude may not accurately correspond with the altitude of the user equipment device.

Thus, in some implementations, when a user equipment device that is located in a building initiates an emergency service call with an emergency service system that includes a PSAP, the user equipment device may not be able to provide an altitude that accurately corresponds with its location in the building within a certain time period to the PSAP or an intermediary in a communication path between the user equipment device and the PSAP. As a result, the PSAP may not be able to quickly dispatch emergency assistance to the location of the user equipment device.

Disclosed herein is a method and corresponding system to help overcome these and other concerns. In accordance with this disclosure, an entity may determine an altitude of a user equipment device located in a building based on a node located in the building, and transmit the determined altitude of the user equipment device. In practice, for instance, a representative method may involve determining a first distance between a node at a known position in a building and a user equipment device located in the building based on known planar coordinates of the node and known planar coordinates of the user equipment device. The method may further involve determining a second distance between the user equipment device and the node based on propagation of at least one signal between the node and the user equipment device. The method may further involve determining an altitude of the user equipment device based on the determined first distance, the determined second distance, and a known altitude of the node. And the method may involve transmitting the determined altitude of the user equipment device.

Further, a representative system may include a communication interface, a processing unit, and non-transitory data storage. And the system may include programming instructions stored in the data storage and executable by the processing unit to carry out functions of the method described above.

These as well as aspects, advantages, and alternatives will become apparent to those of ordinary skill in the art by reading the following description, with reference where appropriate to the accompanying drawings. Further, it should be understood that this overview and the other description throughout this document are provided by way of example and are not intended to be limiting.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present methods and systems will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
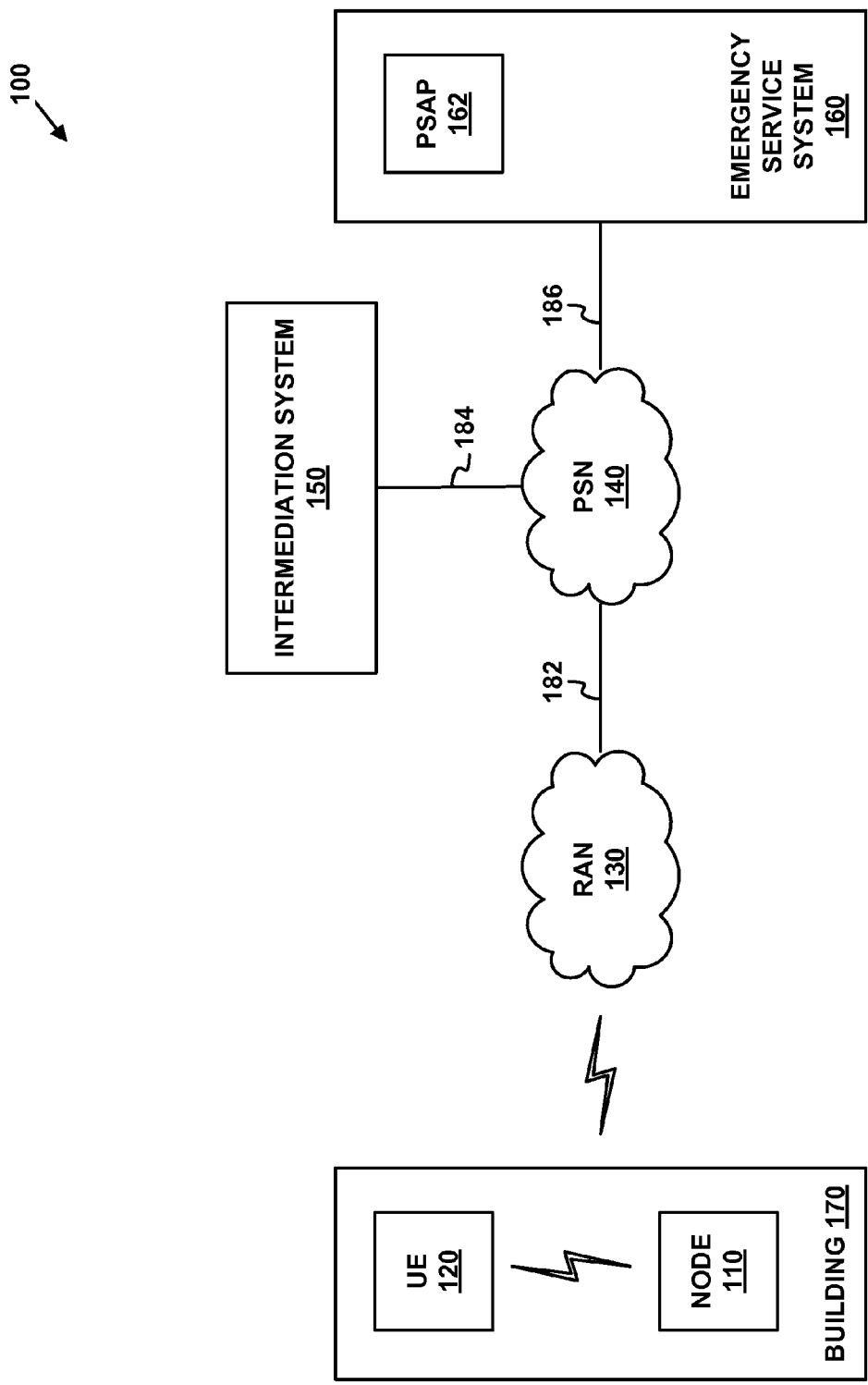
FIG. 1 depicts an example communication system.

Referring to the drawings, FIG. 1 depicts a communication system 100 that includes a node 110, a user equipment device 120, a RAN 130, a packet-switched network (PSN) 140, intermediation system 150, and an emergency service system 160. In this example, emergency service system 160 includes a PSAP 162. And in this example, node 110 and user equipment device 120 are each located in a building 170. The phrase "located in," as used in this disclosure, may refer to located within or located on. For example, node 110 and/or user equipment device 120 may be located within building 170 or located on building 170 (e.g., located on a roof of building 170, located on an exterior wall of building 170, or the like). Other entities could be present in addition to and/or instead of one or more entities depicted in FIG. 1, as this arrangement is presented by way of example. And other variations are possible as well.

Node 110 communicates with user equipment device 120 via an air interface, and with RAN 130 via a second air interface. As examples, node 110 could be or include one or more entities such as an eNodeB, an access gateway, and a wireless gateway. And other entities and/or types of entities are possible as well, as these are listed by way of example. Moreover, user equipment device 120 communicates with RAN 130 via the second air interface.

Further, RAN 130 communicates with PSN 140 via a communication link 182. And PSN 140 communicates with intermediation system 150 via a communication link 184 and with emergency service system 160 via a communication link 186. As one example, PSN 140 could be the Internet. Any or all of the communication links described herein may be bidirectional and may include one or more wired and/or wireless interfaces. Also, there could be one or more routers, switches and/or other devices or networks making up at least part of one or more of the communication links described herein.

User equipment device 120 may place an emergency service call with emergency service system 160. For instance, user equipment device 120 may generate and transmit a Session Initiation Protocol (SIP) INVITE message to set up an emergency service call with emergency service system 160. The SIP INVITE message transmitted by user equipment device 120 generally functions to invoke initiation of a Real-time Transport Protocol (RTP) session between user equipment device 120 and PSAP 162. Emergency service system 160 may receive the SIP INVITE message, respond with a SIP 200 OK message, and then receive a SIP ACK message, completing establishment of an RTP session, and thereby allowing an operator of PSAP 162 to communicate with a user of user equipment device 120. In this example, user equipment device 120 may transmit the SIP INVITE message via the second air interface to RAN 130. The SIP INVITE message may then pass from RAN 130 to PSN 140, and then from PSN 140 to emergency service system 160.

In some examples, the SIP INVITE message may pass through intermediation system 150 on its way from user equipment device 120 to emergency service system 160. With this arrangement, intermediation system 150 may translate or convert the SIP INVITE message, and then pass along the translated or converted SIP INVITE message to emergency service system 160 via PSN 140. As one example, intermediation system 150 could include an IP Multimedia Subsystem (IMS) and/or location-based service (LBS) infrastructure.

Further, additional SIP signaling, such as one or more SIP UPDATE messages may pass from user equipment device 120 to emergency service system 160 during the course of the emergency service call. For instance, user equipment device 120 may transmit a SIP UPDATE message via the second air interface to RAN 130. The SIP UPDATE message may then pass from RAN 130 to PSN 140, and then from PSN 140 to emergency service system 160. And the one or more SIP UPDATE messages may pass through intermediation system 150 on its way from user equipment device 120 to emergency service system 160.

B. Example Radio Access Network (RAN)

Figure 2:
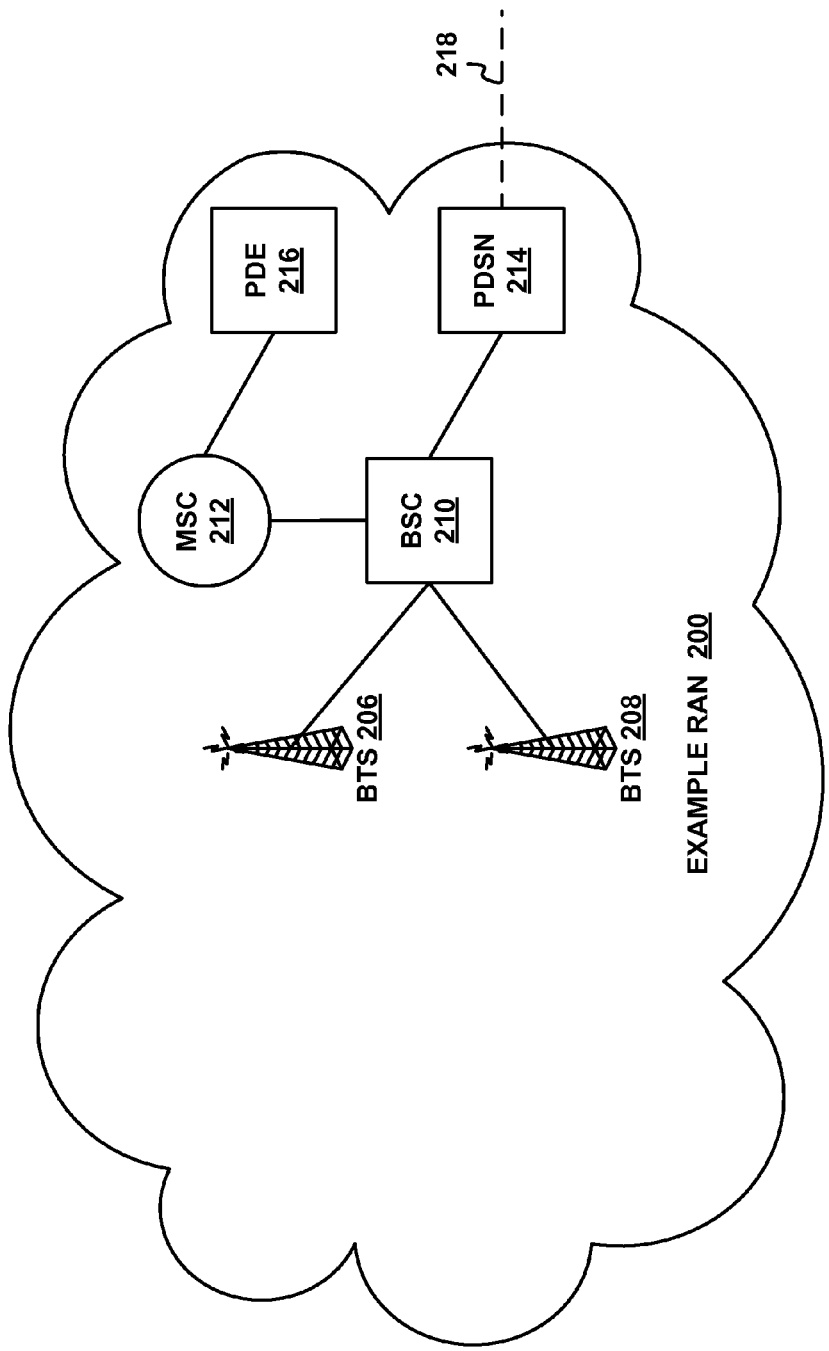
FIG. 2 depicts an example radio access network (RAN) in the context of the example communication system of FIG. 1.

FIG. 2 depicts an example RAN 200, where the RAN 130 of FIG. 1 may have a structure and arrangement similar to that of the example RAN 200 of FIG. 2. RAN 200 is depicted as including a BTS 206, a second BTS 208, a BSC 210, a mobile switching center (MSC) 212, a packet-data serving node (PDSN) 214, and a PDE 216. Other entities could be present in addition to and/or instead of one or more entities depicted in FIG. 2, as this arrangement is presented by way of example. And other variations are possible as well.

Node 110 and/or user equipment device 120 may be served by BTS 206 or BTS 208. BTS 206 and BTS 208 each communicate with BSC 210 via a respective communication link, and BSC 210 in turn communicates with MSC 212 via a communication link, and with PDSN 214 via a communication link. MSC 212 communicates with PDE 216 via a communication link. And PDSN communicates with PSN 140 via a communication link 218. Communication link 218 may represent communication link 182.

Each of BTS 206 and BTS 208 generally functions to provide wireless-communication service to node 110 and/or user equipment device 120 in their respective coverage areas, as described herein, and to bridge air-interface communications with node 110 and/or user equipment device 120 on the one hand and backhaul communications with BSC 210 on the other hand. BSC 210 generally functions to control one or more BTSs, and to provide one or more BTSs with connections to devices such as PDSN 214. PDSN 214 in turn generally functions to provide connectivity to PSN 140.

MSC 212 generally functions to connect BSCs to circuit-switched networks such as a public switched telephone network (not shown), and serves at least a telephone-switch function to facilitate such connections. In addition, MSC 212 generally functions to connect BSCs to PDE 216. The PDE 216 may be any networking element arranged to carry out PDE functions described herein.

C. Example System Entity

Figure 3:
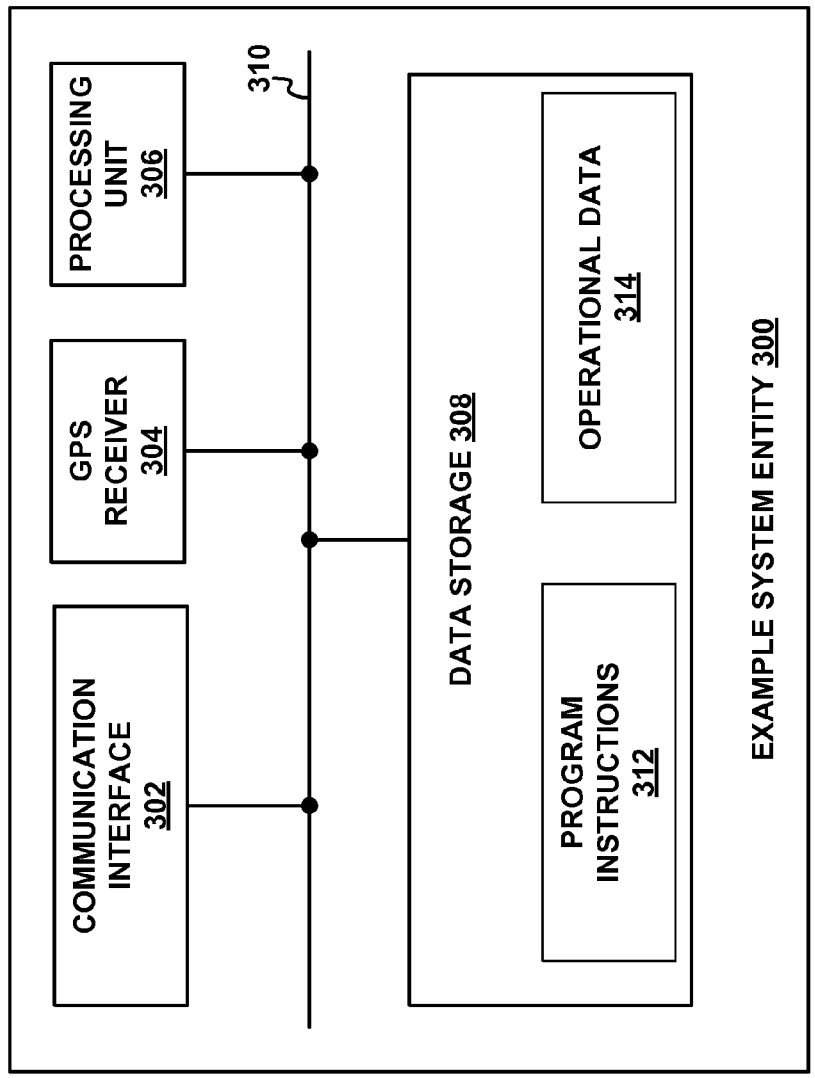
FIG. 3 depicts an example system entity.

FIG. 3 depicts an example system entity 300, such as node 110, intermediation system 150, and PSAP 162, as but a few examples, though any network-side communication entity described herein may have a structure similar to that described with respect to entity 300. As shown, entity 300 may include a communication interface 302, a GPS receiver 304, a processing unit 306, and data storage 308, all of which may be coupled together by a system bus, network, or other communication mechanism 310.

Communication interface 302 may include one or more interfaces (e.g., Ethernet) for engaging in wired communication and/or one or more interfaces (e.g., LTE, Wi-Fi) for engaging in wireless communication. Further, GPS receiver 304 may be any known or later developed GPS receiver, suitable for receiving and decoding GPS satellite signals for location and timing purposes, among other purposes.

Processing unit 306 may comprise one or more general-purpose and/or one or more special-purpose processors, and may be integrated in whole or in part with communication interface 302. Data storage 308 may comprise one or more volatile and/or non-volatile storage components (such as magnetic, optical, flash, or other non-transitory storage) and may be integrated in whole or in part with processing unit 306. As shown, data storage 308 may hold (e.g., store) program instructions 312 that are executable by processing unit 306 to carry out various functions described herein. Additionally, data storage 308 may hold operational data 314 which comprises information that is collected and stored as a result of the functions carried out by executed program instructions 312. And other configurations are possible as well.

In addition, operation data 314 may include information about building 170. For instance, when building 170 includes one or more floors, operation data 314 may include an average floor-to-floor height of the one or more floors, information that indicates the floor of the one or more floors that the node 110 is located in, information that indicates which floors of the one or more floors are located above the node 110, information that indicates which floors of the one or more floors are located below the node 110, and/or a lookup table that contains one or more altitudes that correspond with each floor of the one or more floors.

Entity 300 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

D. Example User Equipment Device

Figure 4:
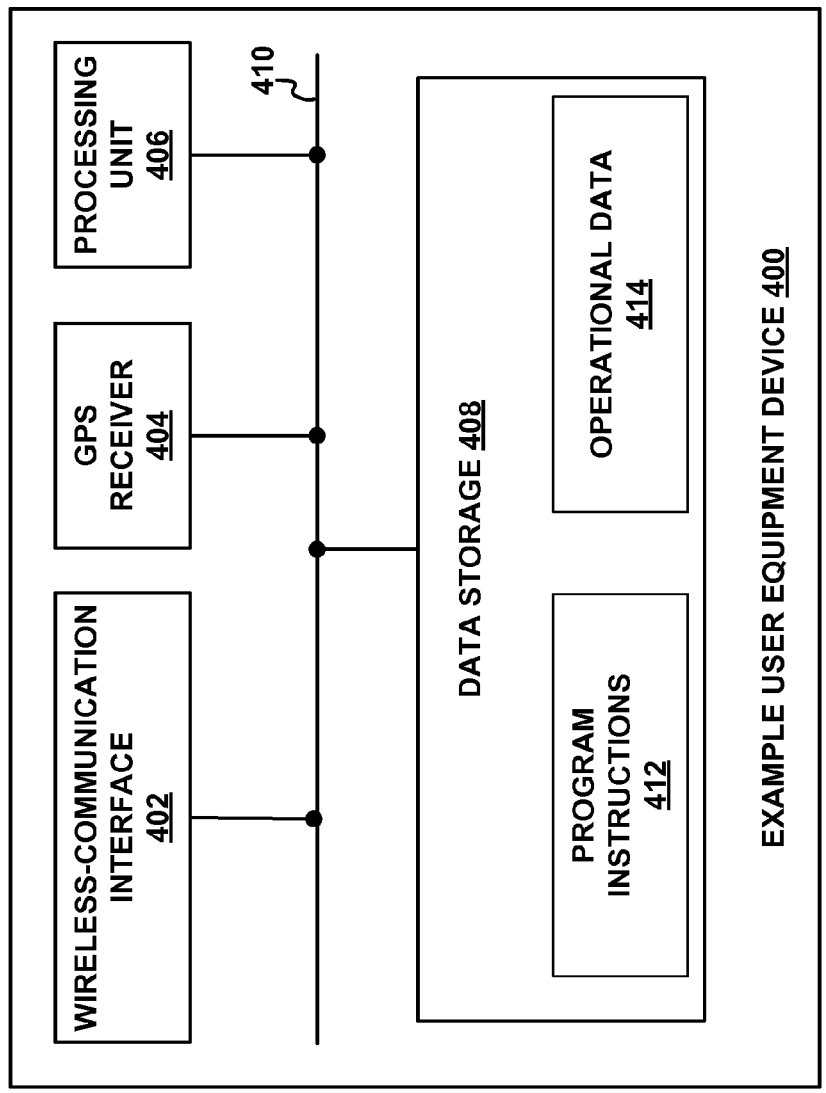
FIG. 4 depicts an example user equipment device.

FIG. 4 depicts an example user equipment device 400, such as user equipment device 120, though any device arranged to carry out mobile-station functions described herein may have a structure similar to that described with respect to entity 400. As shown, entity 400 includes a wireless-communication interface 402, a GPS receiver 404, a processing unit 406, and data storage 408, all of which may be coupled together by a system bus, network, or other communication mechanism 410.

Wireless-communication interface 402 may comprise one or more antennae and one or more chipsets for communicating with one or more base stations over respective air interfaces. As an example, one such chipset could be suited for LTE communication. As another example, one such chipset could be suited for CDMA (e.g., Evolution-Data Optimized (EV-DO)) communication. Wireless-communication interface 402 may also or instead be arranged to communicate according to one or more other types of wireless communication (e.g., protocols) mentioned herein and/or any others now known or later developed. Further, GPS receiver 404 may be any known or later developed GPS receiver, suitable for receiving and decoding GPS satellite signals for location and timing purposes, among other purposes.

Processing unit 406 may comprise one or more general-purpose processors and/or one or more special-purpose processors, and may be integrated in whole or in part with wireless-communication interface 402. Data storage 408 may comprise one or more volatile and/or non-volatile storage components (such as magnetic, optical, flash, or other non-transitory storage), and may be integrated in whole or in part with processing unit 406. As shown, data storage 408 may hold program instructions 412 executable by processing unit 406 for carrying out various user equipment device functions described herein. Additionally, data storage 408 may hold operational data 414 which comprises information that is collected and stored as a result of the functions carried out by executed program instructions 412. And certainly other configurations are possible.

Entity 400 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

E. Example Building

Figure 5:
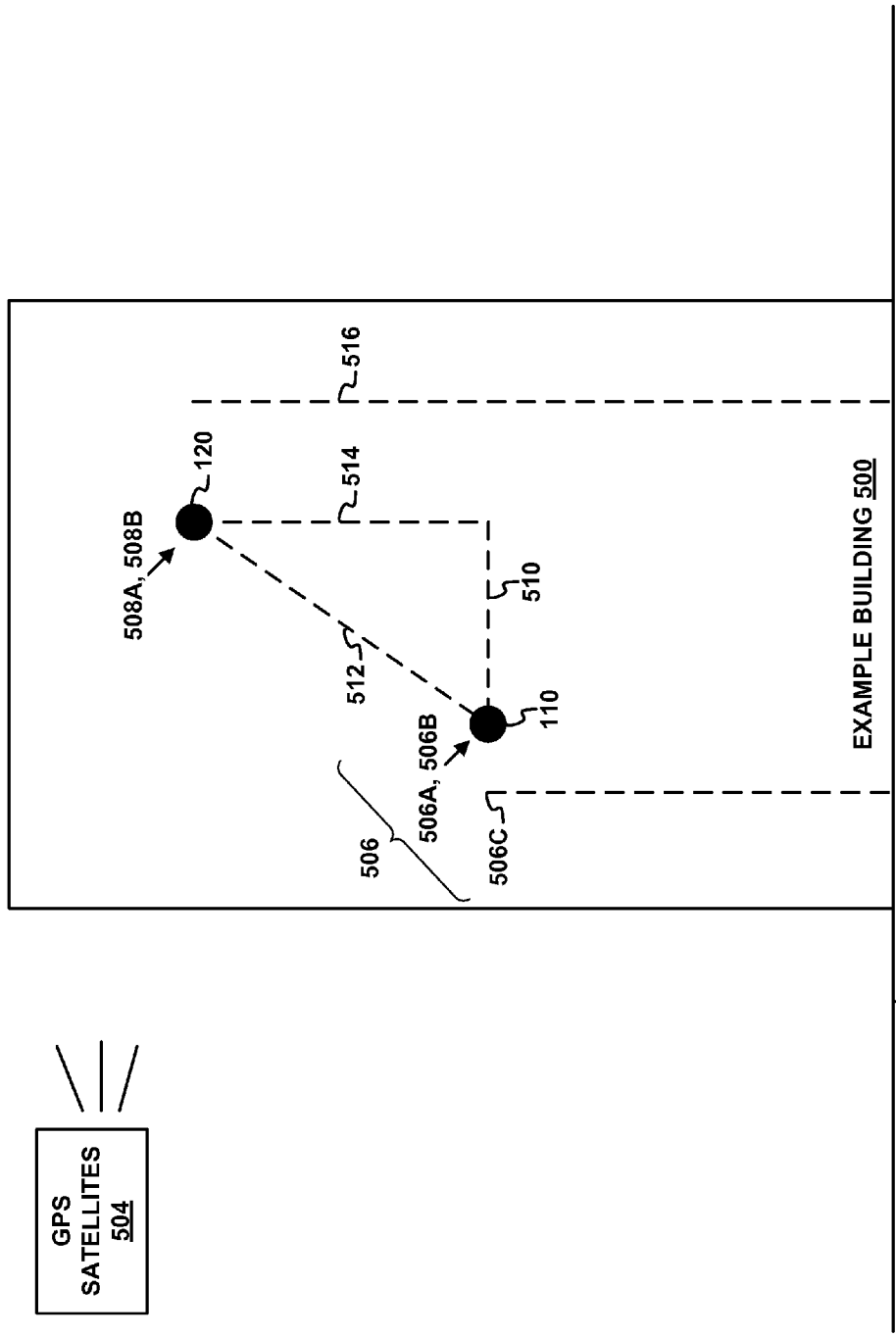
FIG. 5 depicts an example building.

FIG. 5 depicts an example building 500, such as building 170. In this example, building 500 is shown as located on a ground 502, and GPS satellites 504 is located above the ground 502. As examples, building 500 could be or include one or more structures such as a home, an office, a theatre, or a skyscraper. And other structures and/or types of structures are possible as well, as these are listed by way of example. Further, building 500 could include one or more floors. As one example, a floor of the one or more floors may be a walking surface to a ceiling, where a ceiling of a lower floor abuts a walking surface of a next higher floor.

Further still, the ground 502 could be or include one or more terrains, such as a terrain that is flat, sloped, hilly, or mountainous, among other possibilities. And GPS satellites 504 may be one or more of any known or later developed GPS satellite, suitable for transmitting signals.

In this example, node 110 and user equipment device 120 are each located in building 500. And when building 500 includes one or more floors, node 110 and/or user equipment device 120 may be located in a particular floor of the one or more floors. For example, node 110 and/or user equipment device 120 may be located within a particular floor of the one or more floors or located on the particular floor.

Node 110 is located in building 500 at a known position 506. Known position 506 includes a first known planar coordinate 506A, a second known planar coordinate 506B, and a known altitude 506C (e.g., an altitude with respect to ground 502, an altitude above sea level, and the like). In addition, when building 500 includes one or more floors, node 110 may be located in a known floor of the one or more floors. For instance, the one or more floors may include a floor located on ground 502 (e.g., a ground floor, a lobby, or a first floor) and node 110 may be located in the floor located on ground 502.

User equipment device 120 is located in building 500 at a first known planar coordinate 508A and a second known planar coordinate 508B. In at least one embodiment, user equipment device 120 may determine first known planar coordinate 508A and/or second known planar coordinate 508B using signals received from GPS satellites 504.

Moreover, in this example, user equipment device 120 and node 110 are spaced apart from each other in building 500. Functions carried out in accordance with at least one embodiment may determine a first distance 510 between user equipment device 120 and node 110, and a second distance 512 between user equipment device 120 and node 110. As one example, first distance 510 may involve a projection (e.g., a perpendicular projection) of first known planar coordinate 508A and second known planar coordinate 508B to a plane that contains known altitude 506C of node 110. Further, functions carried out in accordance with at least one embodiment may determine a relative altitude 514 of user equipment device 120 (e.g., an altitude with respect to known altitude 506C of node 110) and/or an altitude 516 of user equipment device 120 (e.g., an altitude with respect to ground 502, an altitude above sea level, and the like).

Further, node 110 is depicted in this example as being located below user equipment device 120. However, in other examples, node 110 may be located above user equipment device 120. Accordingly, although altitude 516 of user equipment device 120 is depicted in this example as greater than known altitude 506C of node 110, in other examples altitude 516 of user equipment device 120 may be less than and/or equal to known altitude 506C of node 110. For example, when node 110 is located above user equipment device 120, altitude 516 of user equipment device 120 may be less than known altitude 506C of node 110. As another example, when building 500 includes one or more floors and node 110 and user equipment device 120 are each located in a particular floor of the one or more floors, altitude 516 of user equipment device 120 may be equal to known altitude 506C of node 110.

III. Example Operation

Figure 6:
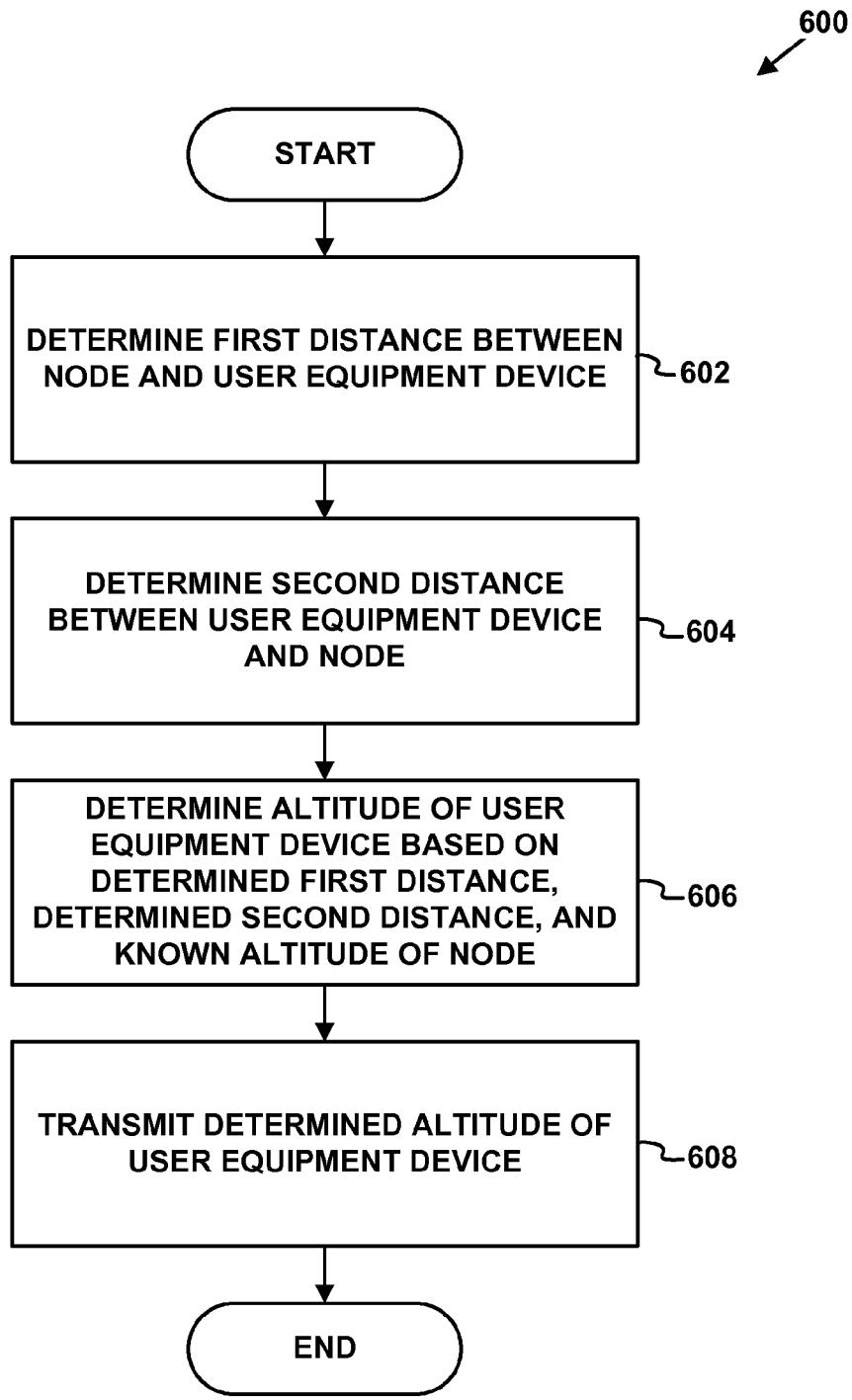
FIG. 6 depicts functions carried out in accordance with at least one embodiment.

FIG. 6 is a flowchart that depicts functions carried out in accordance with at least one embodiment. More particularly, FIG. 6 depicts a method 600. Method 600 could be carried out by various different entities in various different embodiments. In at least one embodiment, the method 600 may be carried out by a node, such as node 110. And in at least one such embodiment, the node may be one or more entities selected from the group consisting of an eNodeB, an access gateway, and a wireless gateway. Moreover, in at least one embodiment, the method 600 may be carried out by a user equipment device, such as user equipment device 120. Further, the method 600 may be carried out by a combination of the node and the user equipment device. And the method 600 could be carried out by other entities and/or types of entities as well, as these are listed here by way of example.

Method 600 begins at block 602 with determining a first distance between a node at a known position in a building and a user equipment device located in the building based on known planar coordinates of the node and known planar coordinates of the user equipment device. As one example, first distance 510 may be determined at block 602.

In at least one embodiment, determining the first distance between the node at the known position in a building and the user equipment device located in the building based on known planar coordinates of the node and known planar coordinates of the user equipment device may involve receiving the known planar coordinates of the user equipment device or the known planar coordinates of the node. As one example, receiving the known planar coordinates of the user equipment device or the known planar coordinates of the node may involve receiving one or more signals carrying the known planar coordinates of the user equipment device or the known planar coordinates of the node. The one or more signals could be any type of radio signal suitable for carrying the known planar coordinates of the user equipment device or the known planar coordinates of the node that does not interfere with an emergency service call between user equipment device 120 and emergency service system 160.

Moreover, in at least one embodiment, determining the first distance between the node at the known position in a building and the user equipment device located in the building based on known planar coordinates of the node and known planar coordinates of the user equipment device may involve determining a first difference between a first known planar coordinate of the node and a corresponding first known planar coordinate of the user equipment device, determining a second difference between a second known planar coordinate of the node and a corresponding second known planar coordinate of the user equipment device, and computing the first distance as a square root of a sum of the first difference squared and the second difference squared. And in at least one such embodiment, the first known planar coordinate of the node may be a latitude of the node and the corresponding first known planar coordinate of the user equipment device may be a latitude of the user equipment device; and the second known planar coordinate of the node may be a longitude of the node and the corresponding second known planar coordinate of the user equipment device may be a longitude of the user equipment device.

However, in other embodiments, the first known planar coordinate of the node may be a longitude of the node and the corresponding first known planar coordinate of the user equipment device may be a longitude of the user equipment device; and the second known planar coordinate of the node may be a latitude of the node and the corresponding second known planar coordinate of the user equipment device may be a latitude of the user equipment device.

Method 600 continues at block 604 with determining a second distance between the user equipment device and the node based on propagation of at least one signal between the node and the user equipment device. As one example, second distance 512 may be determined at block 604. As another example, the at least one signal could be any type of radio signal that does not interfere with an emergency service call between user equipment device 120 and emergency service system 160.

Method 600 continues at block 606 with determining an altitude of the user equipment device based on the determined first distance, the determined second distance, and a known altitude of the node. As one example, altitude 516 of user equipment device 120 may be determined at block 606.

In at least one embodiment, determining the altitude of the user equipment device based on the determined first distance, the determined second distance, and the known altitude of the node may involve determining a relative altitude of the user equipment device based on the determined first distance and the determined second distance, and determining the altitude of the user equipment device based on an offset between the known altitude of the node and the relative altitude of the user equipment device. And in at least one such embodiment, determining the relative altitude of the user equipment device based on the determined first distance and the determined second distance may involve computing the relative altitude of the user equipment device as a square root of a difference between the determined second distance squared and the determined first distance squared. As one example, relative altitude 514 of user equipment device 120 may be determined at block 606.

In addition, block 606 may further involve determining information using the determined altitude of the user equipment device. As one example, when the building includes one or more floors, block 606 may further involve determining using the determined altitude a particular floor of the one or more floors that the user equipment device is located in. And in at least one such example, determining using the determined altitude the particular floor of the one or more floors may involve consulting a lookup table that contains one or more altitudes that correspond with each floor of the one or more floors to make the determination. And certainly other approaches could be used as well.

Any or all of blocks 602, 604, and/or 606 may be performed by a processing unit, such as processing unit 306 or processing unit 406, executing program instructions, such as program instructions 312 or program instructions 412.

Method 600 continues at block 608 with transmitting the determined altitude of the user equipment device. Transmitting the determined altitude of the user equipment device may take various different forms in various different embodiments. For instance, in at least one embodiment, transmitting the determined altitude of the user equipment device may involve transmitting the determined altitude of the user equipment device to an emergency service system. And in at least one such embodiment, transmitting the determined altitude of the user equipment device to the emergency service system may involve transmitting to the emergency service system a signaling message carrying the determined altitude of the user equipment device.

Further, in at least one such embodiment, the emergency service system may include a PSAP, and transmitting to the emergency service system a signaling message carrying the determined altitude of the user equipment device may involve transmitting the signaling message to the PSAP. And in at least one such embodiment, the signaling message may include a SIP message, such as a SIP INVITE message or a SIP UPDATE message.

Further still, in at least one such embodiment, transmitting to the emergency service system the signaling message carrying the determined altitude of the user equipment device may involve receiving a query from the PSAP after a call (e.g., emergency service call) setup between the PSAP and the user equipment device and transmitting the signaling message to the PSAP in response to the received query. Moreover, in at least one such embodiment, transmitting to the emergency service system the signaling message carrying the determined altitude of the user equipment device may involve receiving a query from the PSAP during setup of a call (e.g., an emergency service call) between the PSAP and the user equipment device; and transmitting the signaling message to the PSAP in response to the received query.

And in at least one such embodiment, transmitting to the emergency service system a signaling message carrying the determined altitude of the user equipment device may involve transmitting the signaling message through an intermediation system, such as intermediation system 150.

In addition, block 608 may further involve transmitting other information as well. As examples, the other information may be information determined using the determined altitude, information about the node (e.g., an identifier of the node), or information about the building. And in at least one such example, the other information may be transmitted the same or similar way as the determined altitude may be transmitted as described herein. In addition, in at least one such example, at least some of the other information may be received the same or similar way as the known planar coordinates of the node may be received as described herein.

Block 608 may be performed by a communication interface or a wireless-communication interface, such as communication interface 302 or wireless-communication interface 402.

Further, method 600 might not begin at block 602 with determining a first distance between a node at a known position in a building and a user equipment device located in the building based on known planar coordinates of the node and known planar coordinates of the user equipment device. Instead, as one example, method 600 could begin at block 604 with determining a second distance between the user equipment device and the node based on propagation of at least one signal between the node and the user equipment device. Method 600 could continue at block 602 with determining a first distance between a node at a known position in a building and a user equipment device located in the building based on known planar coordinates of the node and known planar coordinates of the user equipment device. And in such an example, block 604 may involve receiving the known planar coordinates of the user equipment device or the known planar coordinates of the node. The known planar coordinates of the user equipment device or the known planar coordinate of the node may be received at block 604 the same or similar way as the known planar coordinates of the user equipment device or the known planar coordinates of the node may be received at block 602. As another example, block 602 and block 604 may be performed simultaneously.

Figure 7:
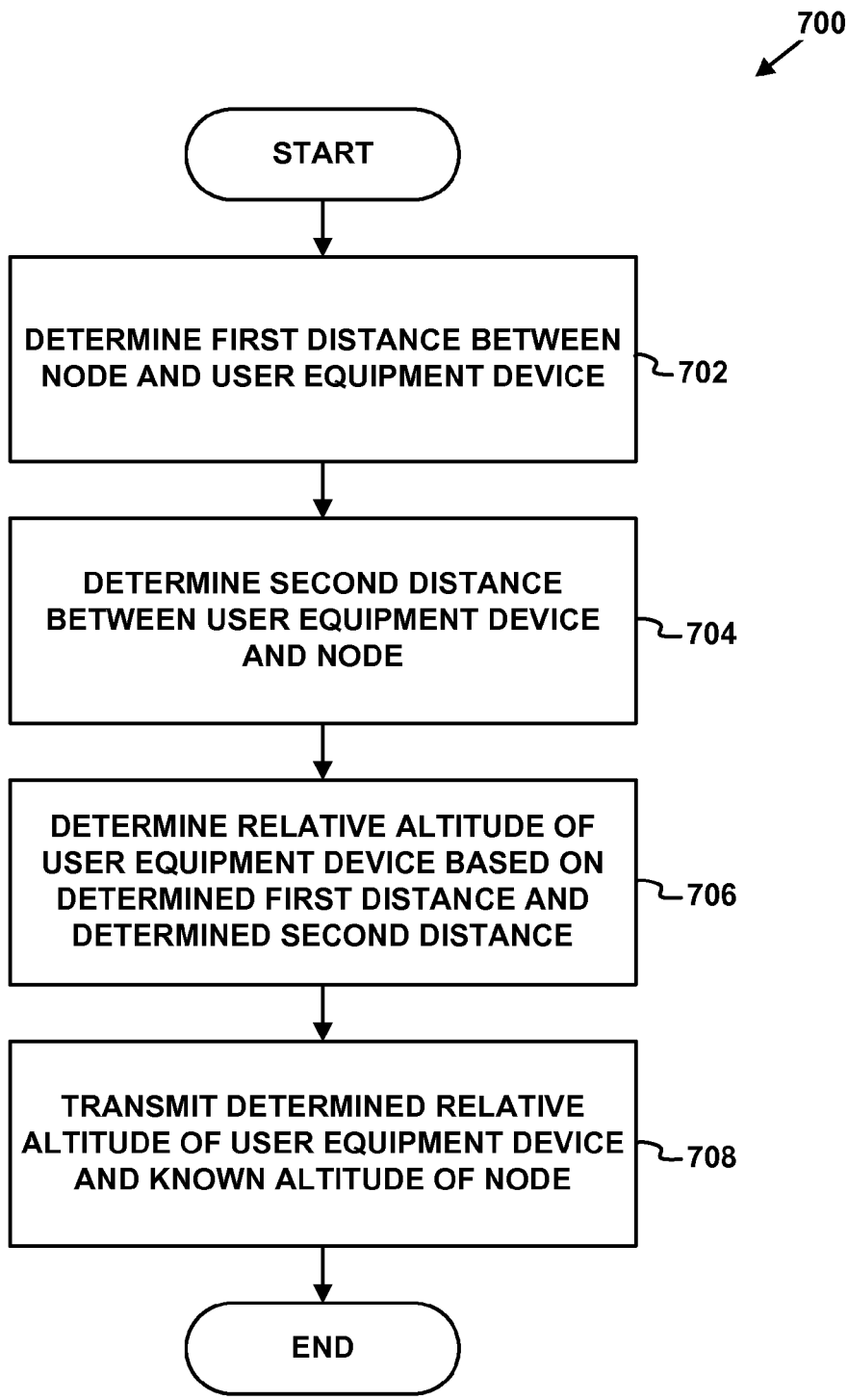
FIG. 7 depicts functions carried out in accordance with at least one other embodiment.

FIG. 7 is a flowchart that depicts functions carried out in accordance with at least one other embodiment. More particularly, FIG. 7 depicts a method 700. Method 700 may be carried out by any of the entities or combination of entities that carry out method 600. Method 700 begins at block 702 with determining a first distance between a node at a known position in a building and a user equipment device located in the building based on known planar coordinates of the node and known planar coordinates of the user equipment device. Block 702 may performed the same or similar way as block 602 may be performed in method 600 as described with reference to FIG. 6. As one example, first distance 510 may be determined at block 702.

Method 700 continues at block 704 with determining a second distance between the user equipment device and the node based on propagation of at least one signal between the node and the user equipment device. Block 704 may be performed the same or similar way as block 604 may be performed in method 600 as described with reference to FIG. 6. And at block 704, the at least one signal may take the form of or be similar in form to the at least one signal at block 604. As one example, second distance 512 may be determined at block 704.

Method 700 continues at block 706 with determining a relative altitude of the user equipment device based on the determined first distance and the determined second distance. In at least one embodiment, determining the relative altitude of the user equipment device based on the determined first distance and the determined second distance may involve computing the relative altitude of the user equipment device as a square root of a difference between the determined second distance squared and the determined first distance squared. As one example, relative altitude 514 of user equipment device 120 may be determined at block 706.

In addition, block 706 may further involve determining information using the determined relative altitude of the user equipment device and the known altitude of the node. As one example, when the building includes one or more floors, block 706 may further involve determining using the determined relative altitude of the user equipment device and the known altitude of the node a particular floor of the one or more floors that the user equipment device is located in. And in at least one such example, determining using the determined relative altitude of the user equipment device and the known altitude of the node the particular floor of the one or more floors may involve consulting a lookup table that contains one or more altitudes that correspond with each floor of the one or more floors to make the determination. And certainly other approaches could be used as well.

Any or all of blocks 702, 704, and 706 may be performed by a processing unit, such as processing unit 306 or processing unit 406, executing program instructions, such as program instructions 312 or program instructions 412.

Method 700 continues at block 708 with transmitting (i) the determined relative altitude of the user equipment device and (ii) a known altitude of the node. Transmitting the determined relative altitude of the user equipment device and the known altitude of the node could take various different forms in various different embodiments. For instance, in at least one embodiment, transmitting the determined relative altitude of the user equipment device and the known altitude of the node may involve transmitting the determined relative altitude of the user equipment device and the known altitude of the node to an emergency service system. And in at least one such embodiment, transmitting the determined relative altitude of the user equipment device and the known altitude of the node to the emergency service system may involve transmitting to the emergency service system a signaling message carrying the determined relative altitude of the user equipment device and the known altitude of the node.

Further, in at least one such embodiment, the emergency service system may include a PSAP, and transmitting to the emergency service system a signaling message carrying the determined relative altitude of the user equipment device and the known altitude of the node may involve transmitting the signaling message to the PSAP. And in at least one such embodiment, the signaling message may include a SIP message, such as a SIP INVITE message or a SIP UPDATE message.

Further still, in at least one such embodiment, transmitting to the emergency service system the signaling message carrying the determined relative altitude of the user equipment device and the known altitude of the node may involve receiving a query from the PSAP after a call (e.g., an emergency service call) setup between the PSAP and the user equipment device and transmitting the signaling message to the PSAP in response to the received query. Further still, in at least one such embodiment, transmitting to the emergency service system the signaling message carrying the determined altitude of the user equipment device may involve receiving a query from the PSAP during setup of a call (e.g., an emergency service call) between the PSAP and the user equipment device and transmitting the signaling message to the PSAP in response to the received query.

And in at least one such embodiment, transmitting to the emergency service system a signaling message carrying the determined relative altitude of the user equipment device and the known altitude of the node may involve transmitting the signaling message through an intermediation system, such as intermediation system 150.

In addition, block 708 may involve transmitting other information as well. As examples, the other information may be information determined using the determined relative altitude of the user equipment device and the known altitude of the node, information about the node (e.g., an identifier of the node), or information about the building. And in at least one such example, the other information may be transmitted the same or similar way as the determined relative altitude and the known altitude of the node may be transmitted as described herein. In addition, in at least one such example, at least some of the other information may be received the same or similar way as the known planar coordinates of the node may be received as described herein.

Block 708 may be performed by a communication interface or a wireless-communication interface, such as communication interface 302 or wireless-communication interface 402.

Further, method 700 might not begin at block 702 with determining a first distance between a node at a known position in a building and a user equipment device located in the building based on known planar coordinates of the node and known planar coordinates of the user equipment device. Instead, as one example, method 700 could begin at block 704 with determining a second distance between the user equipment device and the node based on propagation of at least one signal between the node and the user equipment device. Method 700 could continue at block 702 with determining a first distance between a node at a known position in a building and a user equipment device located in the building based on known planar coordinates of the node and known planar coordinates of the user equipment device. And in such an example, block 704 may involve receiving the known planar coordinates of the user equipment device or the known planar coordinates of the node. The known planar coordinates of the user equipment device or the known planar coordinate of the node may be received at block 704 the same or similar way as the known planar coordinates of the user equipment device or the known planar coordinates of the node may be received at block 602. As another example, block 702 and block 704 may be performed simultaneously.

In addition, an entity performing method 600 or method 700 may further be configured to determine whether the node is located below the user equipment device. As one example, the entity may be configured to make a determination that the node is located below the user equipment device when the entity receives one or more signals, such as the one or more signals described with reference to blocks 602, 702 and/or the at least one signal described with reference to blocks 604, 704, having a certain signal strength. Further, an entity performing method 600 or method 700 may be configured to block (e.g., ignore) one or more signals, such as the one or more signals described with reference to blocks 602, 702 and/or the at least one signal described with reference to blocks 604, 704, when the one or more signals are located below the node.

Further, an entity performing method 600 or method 700 may further be configured to determine whether the node is located above the user equipment device. As one example, the entity may be configured to make a determination that the node is located above the user equipment device when the entity receives one or more signals, such as the one or more signals described with reference to blocks 602, 702 and/or the at least one signal described with reference to blocks 604, 704, having a certain signal strength. Further, an entity performing method 600 or method 700 may be configured to block (e.g., ignore) one or more signals, such as the one or more signals described with reference to blocks 602, 702 and/or the at least one signal described with reference to blocks 604, 704, when the one or more signals are located above the node.

Moreover, when the building includes one or more floors, an entity performing method 600 or method 700 may further be configured to transmit information about a first floor of the one or more floors and information about a second floor of the one or more floors. The first floor and the second floor may be any floor of the one or more floors. For example, when the building includes thirty five floors that are each located above ground, such as ground 502, the first floor may be the thirtieth floor of the thirty five floors and the second floor may be the thirty fifth floor of the thirty five floors.

Further, the information about the first floor may indicate the floor that the user equipment device is located in when the node is located below the user equipment device. Further still, the information about the second floor may indicate the floor that the user equipment device is located in when the node is located above the user equipment device. The entity may transmit the information about the first floor and the information about the second floor the same or similar way as the determined altitude of the user equipment device may be transmitted as described with reference to block 608 or the determined relative altitude of the user equipment device and known altitude of the node may be transmitted as described with reference to block 708.

IV. Conclusion

While some example embodiments have been described above, those of ordinary skill in the art will appreciate that numerous changes to the described embodiments could be made without departing from the scope and spirit of the claims.

What is claimed is:
1. A method comprising:
 at a computing device that is located at fixed planar coordinates and a fixed altitude in a building and is preconfigured with stored data indicating the fixed planar coordinates and the fixed altitude, receiving data indicating planar coordinates of a user equipment device (UE) located in the building;
 the computing device determining a first distance between the computing device and the UE based on the stored data indicating the fixed planar coordinates of the computing device and the received data indicating the planar coordinates of the UE;

the computing device determining a second distance between the UE and the computing device based on propagation of at least one signal between the computing device and the UE;

the computing device determining an altitude of the UE based on the determined first distance, the determined second distance, and the fixed altitude of the computing device; and the computing device transmitting the determined altitude of the UE to an emergency service system, wherein the emergency service system comprises a Public Safety Answering Point (PSAP), and wherein the computing device transmitting the determined altitude of the UE to the emergency service system comprises:

the computing device receiving a query from the PSAP (i) after setup of a call between the PSAP and the UE, or (ii) during setup of the call between the PSAP and the UE, and the computing device transmitting a signaling message carrying the determined altitude of the UE to the PSAP in response to the received query.

2. The method of claim 1, wherein the computing device is one or more entities selected from the group consisting of an eNodeB, an access gateway, and a wireless gateway.

3. The method of claim 1, wherein the computing device determining the first distance between the computing device and the UE based on the stored data indicating the fixed planar coordinates of the computing device and the received data indicating the planar coordinates of the UE comprises:

the computing device determining a first difference between a first fixed planar coordinate of the computing device and a corresponding first received planar coordinate of the UE;

the computing device determining a second difference between a second fixed planar coordinate of the computing device and a corresponding second received planar coordinate of the UE; and the computing device computing the first distance as a square root of a sum of the first difference squared and the second difference squared.

4. The method of claim 1, wherein the computing device determining the altitude of the UE based on the determined first distance, the determined second distance, and the fixed altitude of the computing device comprises:

the computing device determining a relative altitude of the UE based on the determined first distance and the determined second distance; and the computing device determining the altitude of the UE based on an offset between the known altitude of the computing device and the relative altitude of the UE.

5. The method of claim 4, wherein determining the relative altitude of the UE based on the determined first distance and the determined second distance comprises the computing device computing the relative altitude of the UE as a square root of a difference between the determined second distance squared and the determined first distance squared.

6. The method of claim 1, wherein the signaling message comprises a Session Initiation Protocol (SIP) INVITE message or a SIP UPDATE message.

7. The method of claim 1, wherein the computing device transmitting to the PSAP the signaling message carrying the determined altitude of the UE comprises transmitting the signaling message through an intermediation system.

8. A computing device that is located at fixed planar coordinates and a fixed altitude in a building, the computing device comprising:

a communication interface;

a processing unit;

non-transitory data storage;

data stored in the non-transitory data storage that indicates the fixed planar coordinates and the fixed altitude of the computing device; and program instructions stored in the non-transitory data storage and executable by the processing unit to carry out functions comprising:

receiving data indicating planar coordinates of a user equipment device (UE) located in a building, determining a first distance between the computing device and the UE based on the fixed planar coordinates of the computing device and the received planar coordinates of the UE, determining a second distance between the UE and the computing device based on propagation of at least one signal between the computing device and the UE, determining an altitude of the UE based on the determined first distance, the determined second distance, and the fixed altitude of the computing device, and transmitting the determined altitude of the UE to an emergency service system, wherein the emergency service system comprises a Public Safety Answering Point (PSAP), and wherein the computing device transmitting the determined altitude of the UE to the emergency service system comprises:

the computing device receiving a query from the PSAP (i) after setup of a call between the PSAP and the UE, or (ii) during setup of the call between the PSAP and the UE, and the computing device transmitting a signaling message carrying the determined altitude of the UE to the PSAP in response to the received query.

9. The computing device of claim 8, wherein the computing device is one or more entities selected from the group consisting of an eNodeB, an access gateway, and a wireless gateway.

10. The computing device of claim 8, wherein determining the first distance between the computing device and the UE based on the stored data indicating the fixed planar coordinates of the computing device and the received data indicating the planar coordinates of the UE comprises:

determining a first difference between a first fixed planar coordinate of the computing device and a corresponding first received planar coordinate of the UE;

determining a second difference between a second fixed planar coordinate of the computing device and a corresponding second received planar coordinate of the UE; and computing the first distance as a square root of a sum of the first difference squared and the second difference squared.

11. The computing device of claim 8, wherein determining the altitude of the UE based on the determined first distance, the determined second distance, and the fixed altitude of the computing device comprises:

determining a relative altitude of the UE based on the determined first distance and the determined second distance; and determining the altitude of the UE based on an offset between the fixed altitude of the computing device and the relative altitude of the UE.

12. The computing device of claim 8, wherein determining the relative altitude of the UE based on the determined first distance and the determined second distance comprises computing the relative altitude of the UE as a square root of a difference between the determined second distance squared and the determined first distance squared.

13. A method comprising:

at a computing device that is located at fixed planar coordinates and a fixed altitude in a building and is preconfigured with data indicating the fixed planar coordinates and the fixed altitude, receiving data indicating planar coordinates of a user equipment device (UE) located in the building;

the computing device determining a first distance between the computing device and a the UE based on the stored data indicating the fixed planar coordinates of the computing device and the fixed planar coordinates of the UE;

the computing device determining a second distance between the UE and the computing device based on propagation of at least one signal between the computing device and the UE;

the computing device determining a relative altitude of the UE based on the determined first distance and the determined second distance; and the computing device transmitting (i) the determined relative altitude of the UE to an emergency service system and (ii) a known altitude of the computing device to the emergency service system, wherein the emergency service system comprises a Public Safety Answering Point (PSAP), and wherein the computing device transmitting (i) the determined relative altitude of the UE to the emergency service system and (ii) the known altitude of the computing device to the emergency service system comprises:

the computing device receiving a query from the PSAP (i) after setup of a call between the PSAP and the UE, or (ii) during setup of the call between the PSAP and the UE, and the computing device transmitting one or more signaling messages to the PSAP in response to the received query, wherein the one or more signaling messages carry (i) the determined relative altitude of the UE and (ii) the known altitude of the computing device.

* * * * *